March 20, 1934.    J. G. FRAYNE ET AL    1,951,903
SOUND FILM RECORDING SYSTEM
Filed Sept. 30, 1932    2 Sheets-Sheet 1

INVENTORS: J.G.FRAYNE
R.R.SCOVILLE
BY
ATTORNEY

March 20, 1934.  J. G. FRAYNE ET AL  1,951,903
SOUND FILM RECORDING SYSTEM
Filed Sept. 30, 1932  2 Sheets-Sheet 2

INVENTORS: J.G. FRAYNE
R.R. SCOVILLE
BY G.H.Heydt
ATTORNEY

Patented Mar. 20, 1934

1,951,903

UNITED STATES PATENT OFFICE 1,951,903

SOUND FILM RECORDING SYSTEM

John G. Frayne, Pasadena, and Ray R. Scoville, Los Angeles, Calif., assignors to Electrical Research Products, Inc., New York, N. Y., a corporation of Delaware Application September 30, 1932, Serial No. 635,512

5 Claims. (Cl. 179—100.3)

This invention relates to sound film recording systems and more particularly to devices for monitoring the sound recorded in such systems.

In the majority of sound film recording systems it has been the practice to monitor the sound being recorded by means of a photoelectric cell placed behind the moving negative film to receive the modulated light after it has passed through such film. However, it has been found that the system of monitoring just described does not produce a sufficiently true reproduction of the sound being recorded due to the distortion in the light beam introduced by the film in its passage through such beam.

The present invention has been developed more particularly for use in sound film recording systems in which a beam of light is projected to a moving film through an elongated slit whose length transversely of the film remains constant, but whose width longitudinally of the film is varied in accordance with the sound to be recorded to produce on such film a variable density sound record.

It is the object of this invention to provide, in a recording system of the type described, a means for monitoring the sound being recorded directly from the modulated beam without introducing distortion in such beam before it passes to the recording film.

A feature of the invention lies in the provision of a pair of vertical mirrors interposed in the modulated light beam to intercept and deflect the portions of the light beam emerging from the ends of the elongated slit forming part of the modulating device.

A further feature of the invention lies in the provision of a monitoring device in the form of an attachment which may be conveniently and readily attached to existing recording apparatus.

In accordance with this invention there is provided an attachment comprising a casing having an apertured wall and containing a photoelectric cell. At the apertured portion of the casing there is provided an enclosed rectangular extension, one end of which is attached to the casing and the other end of which supports a pair of elongated mirrors. The end of the extension containing the mirrors is apertured on two sides to permit the passage of the modulated light beam to the objective lens and photographic film. Referring to the drawings.

Figure 1:
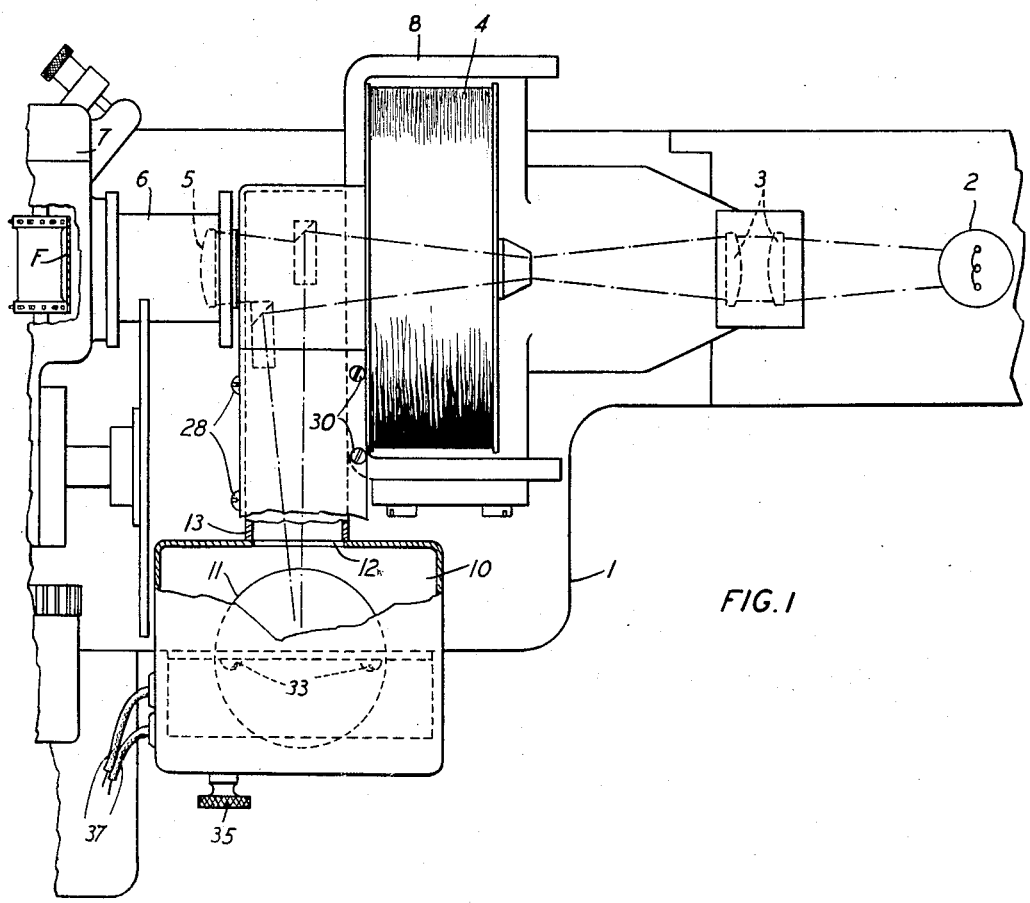
Fig. 1 is a plan view of a standard sound film recording machine with the monitoring attachment secured thereto.

Referring to Fig. 1, a sound film recording machine having a base 1 has mounted thereon a light source 2, condenser lens system 3, a light valve 4 and an objective lens system 5 mounted in a cylindrical member 6 which extends into compartment 7. Compartment 7 contains film driving mechanism for moving a negative photographic film F at uniform speed past the objective lens system 5. There is provided a support 8 for mounting the light valve 4 in position. The path of the light beam from source 2 to objective lens system 5 is shown in dotted lines.

In accordance with the invention, an attachment is provided which may be readily secured to the recording machine to provide a means for monitoring the sound being recorded on the film F in compartment 7. This attachment comprises a compartment 10 containing a photoelectric cell 11. One wall of compartment 10 contains an aperture 12. A rectangular enclosure 13 extends from the compartment 10 adjacent the apertures 12 in one wall thereof. The free end of enclosure 13 extends into the modulated light beam between the light valve 4 and the objective lens 5.

Figure 3:
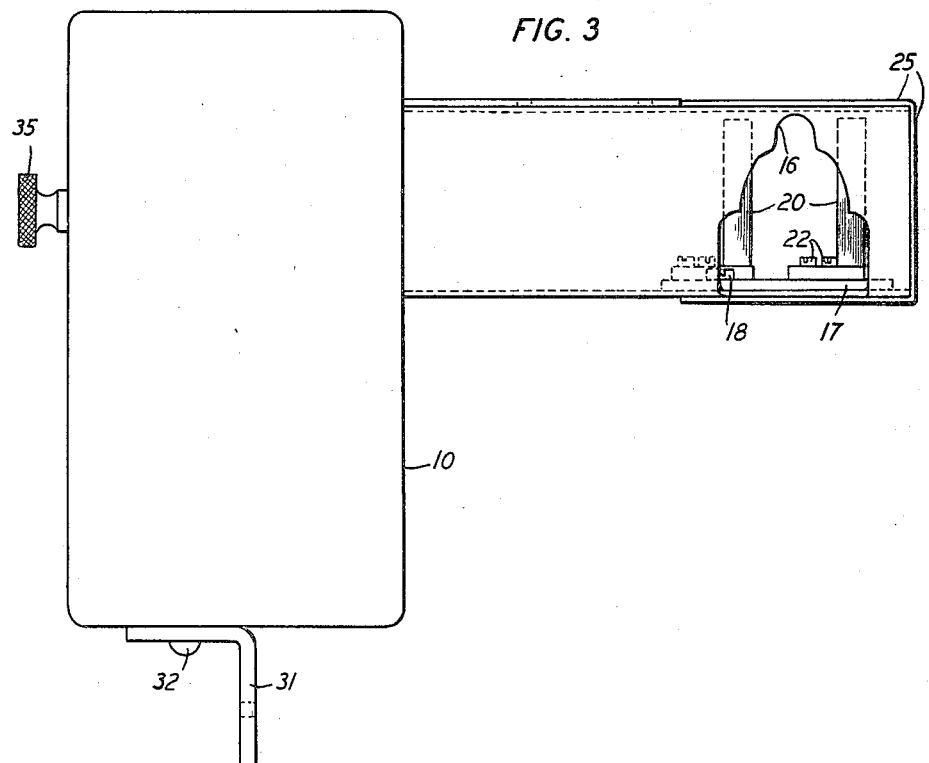
Fig. 3 is a side elevation of the monitoring attachment showing the apertured side wall and the position of the reflecting mirrors with respect thereto.

As shown in Fig. 3, opposite side walls of the free end of enclosure 13 are apertured as shown at 16 to permit the passage of the modulated beam to the objective lens 5.

A member 17 is secured to the enclosure 13 by means of bolts 18 extending through elongated slots 19 into the bottom wall of enclosure 13. The slots are provided to permit adjustment of the member 17 along the bottom wall of the enclosure 13.

Figure 2:
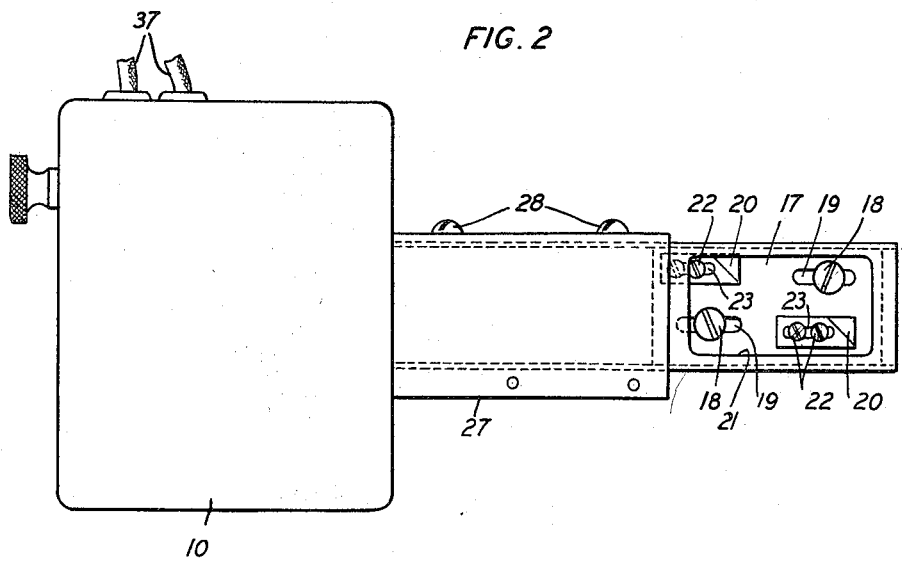
Fig. 2 is a plan view of the monitoring attachment with the end cover plate removed and showing the position of the deflecting mirrors.

Adjustably mounted on the member 17, at opposite sides of the aperture 16, are vertical deflecting mirrors 20. In Fig. 2 an end cover plate 25 (Fig. 3) is removed to show the position of mirrors 20 on the member 17. These mirrors are attached to member 17 by means of bolts extending through slots 23 and into the member 17. It will be seen that the two mirrors may be moved as a unit by movement of the plate member 17 or they may be moved independently into and out of the modulated light beam. Adjustment of the mirrors may be made while the atachment is in place, through the aperture 21.

An angle plate 27 secured to the outside wall of enclosure 13 by means of screws 28 provides a means of securing the attachment to the light valve support 8. This is done by means of screws 30 (Fig. 1) which extend through plate 27 into light valve support 8. A second angle plate 31 secured to the bottom of compartment 10 by means of screws 32 provides a further means of securing the attachment to the base 1 of the recording machine. This is accomplished by means of screws 33 as shown in Fig. 1.

In Fig. 3 is shown the U-shaped end cover plate 25 which is placed on the free end of the enclosure 13 after adjustment of the mirrors have been made, to prevent extraneous light reaching the modulated beam through the aperture 21 and the open end of the enclosure 13.

To permit access to the photoelectric cell a door having a knob 35 is provided on one side of compartment 10. Electrical connection to photoelectric cell 11 is made through wires 37.

The attachment herein disclosed is light in weight and may be readily and conveniently attached to existing standard film recording machines.

What is claimed is:

1. The combination in a sound film recording apparatus having means to project a beam of light toward a moving film and means for modulating said beam in accordance with the sound to be recorded, of a monitoring attachment for said apparatus, said attachment comprising an enclosed chamber having an apertured wall, a rectangular enclosure extending from said chamber adjacent the aperture therein, opposite walls at the free end of said extension being apertured to permit the passage therethrough of said light beam, deflecting members mounted in the path of said beams at opposite sides of the apertures in said enclosure and a light sensitive device mounted in said chamber to receive the portion of said beam deflected by said members.

2. A monitoring device in the form of an attachment for sound film recording apparatus comprising an apertured chamber, an elongated enclosure extending from said chamber adjacent the aperture therein, said elongated enclosure having apertures in the opposite walls of the free end thereof, a pair of deflecting mirrors located adjacent the aperture in said elongated enclosure, means for adjusting said mirrors simultaneously and means for independently adjusting each of said mirrors.

3. A monitoring device in the form of an attachment for sound film recording apparatus comprising an apertured chamber, an elongated enclosure extending from said chamber adjacent the aperture therein, said elongated enclosure having apertures in the opposite walls of the free end thereof, a pair of deflecting mirrors adjustably secured within said enclosure at opposite sides of the aperture in the free end thereof, and a photoelectric cell mounted within said chamber adjacent the aperture therein.

4. The combination in a sound film recording machine having an apertured casing containing film propelling mechanism, a light source, optical means for projecting light from said source to said apertured casing, a light modulating device located in said projected light beam, and a support therefor, of a detachable monitoring unit comprising an apertured chamber containing a light sensitive device, an elongated enclosure extending from said chamber adjacent the aperture therein, said elongated enclosure having apertures in the opposite walls of the free end thereof, a pair of deflecting mirrors located adjacent the aperture in said elongated enclosure, and means mounted on said enclosure for detachably securing said unit to the support for said modulating device.

5. The combination in a sound film recording machine having a base member supporting a light source, optical means for projecting an image of said source, film propelling mechanism, and a support for a light modulating device, of a monitoring attachment comprising an apertured chamber containing a light sensitive device, an enclosure extending from said chamber adjacent the aperture therein, said enclosure being apertured at opposite sides of the free end thereof, a pair of mirrors located adjacent the aperture in said enclosure, and means for detachably securing said attachment to said base and said modulating device support in such position that said light beam passes through said apertured ends of said enclosure.

JOHN G. FRAYNE.
RAY R. SCOVILLE.